April 9, 1963 W. P. KERN ET AL 3,085,155
APPARATUS FOR MEASURING NUCLEAR RADIATION
Filed April 17, 1959 3 Sheets-Sheet 1
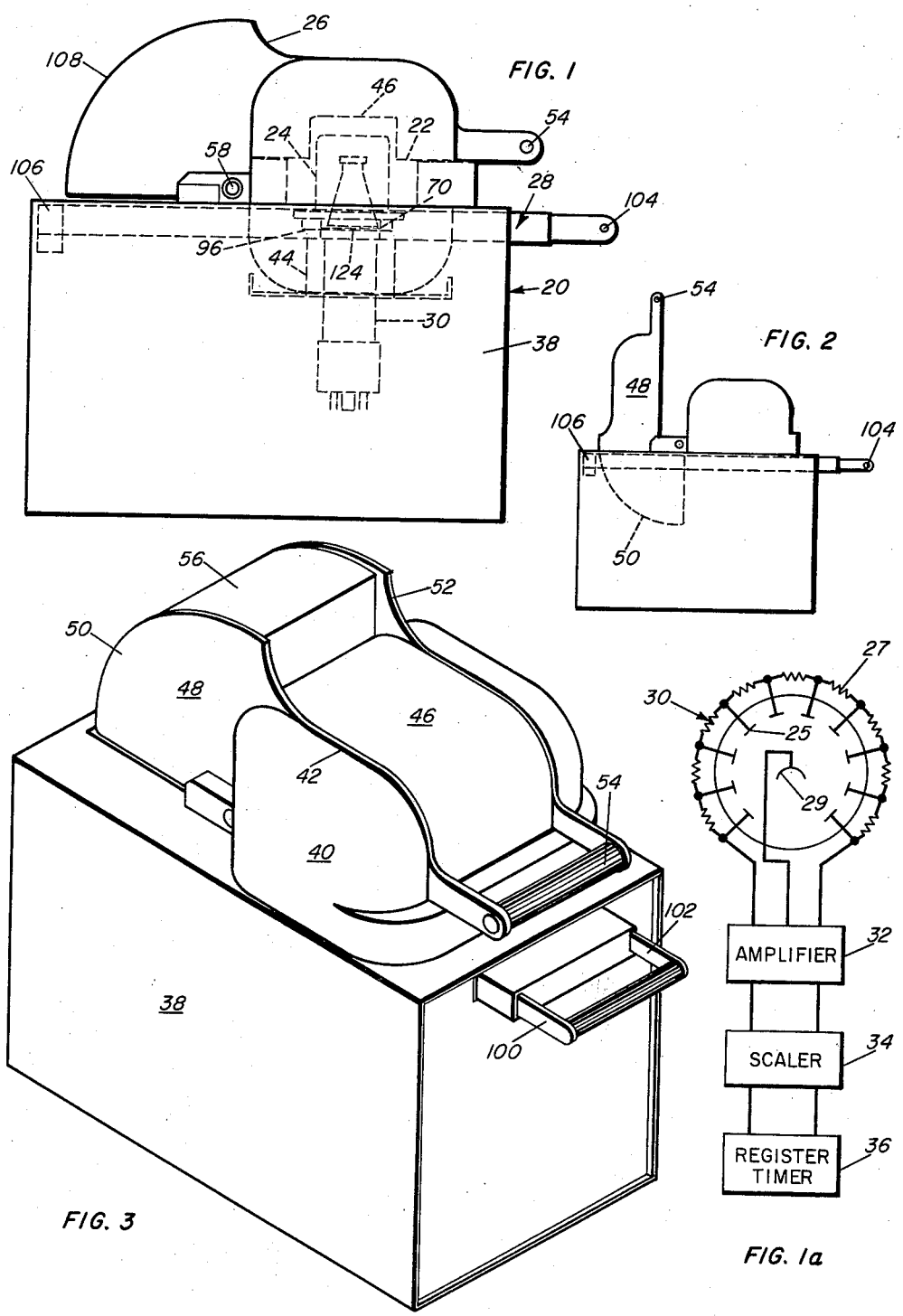

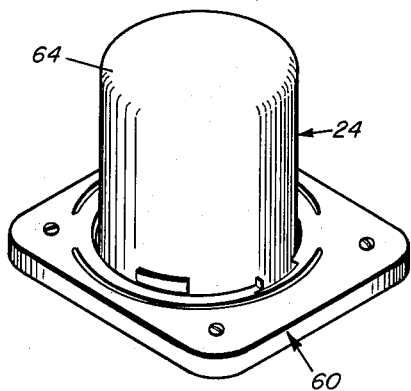
FIG. 4
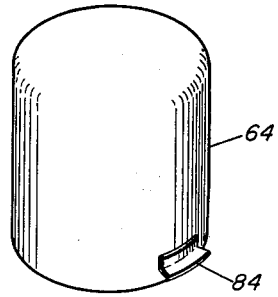
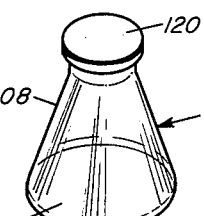
FIG. 5
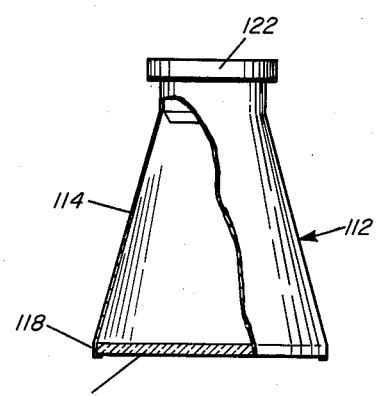
FIG. 10
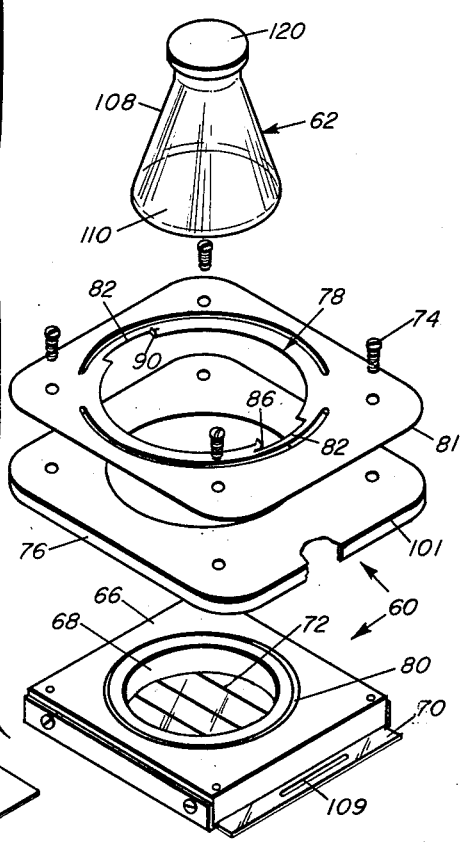
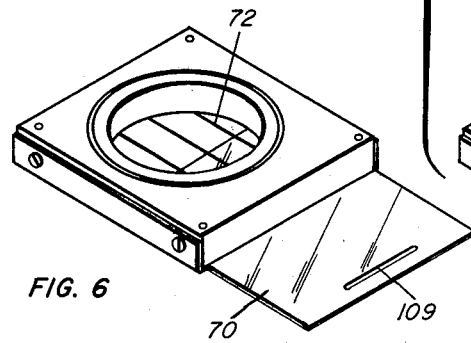
FIG. 6

April 9, 1963  W. P. KERN ET AL  3,085,155
APPARATUS FOR MEASURING NUCLEAR RADIATION
Filed April 17, 1959  3 Sheets-Sheet 3
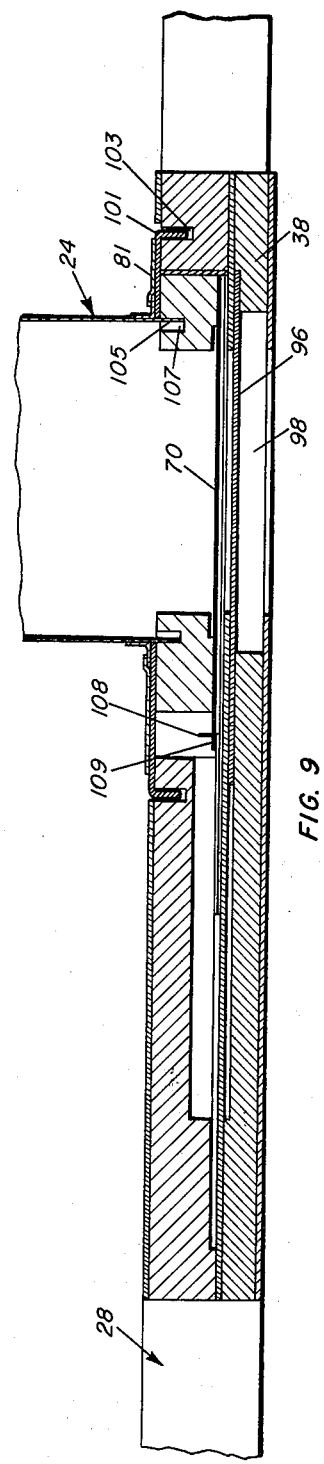
FIG. 9
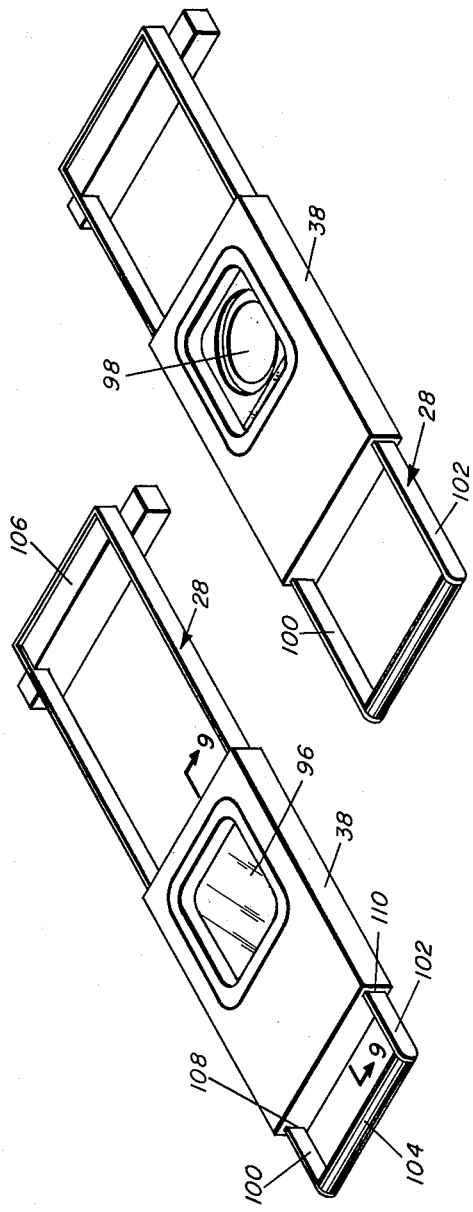
FIG. 8
FIG. 7

United States Patent Office 3,085,155
Patented Apr. 9, 1963

3,085,155
APPARATUS FOR MEASURING NUCLEAR RADIATION
Walter P. Kern, Cohasset, Hugh F. Stoddart, South Sudbury, and James B. Williams, Lexington, Mass., assignors to Baird-Atomic, Inc., Cambridge, Mass., a corporation of Massachusetts
Filed Apr. 17, 1959, Ser. No. 807,209
8 Claims. (Cl. 250—71.5)

The present invention relates to the measurement of nuclear radiation and, more particularly, to novel devices and products for measuring the disintegration rates of unknown samples. The luminescence exhibited by certain substances upon irradiation by nuclear disintegrations has been employed in various ways to determine the radioactivity of an unknown sample. For example, the flash of radiation resulting from a disintegration may cause the generation of a flash of light or a scintillation in a solid phosphor, in consequence of which an electronic pulse is generated in the circuit of a detector. Alternatively, it is possible to disperse both a radioactive sample and a luminescent material within a liquid for the purpose of generating scintillations to be counted. This is particularly necessary for counting soft radiation such as tritium $\beta$ radiation, which otherwise may be unduly absorbed before reaching the detector. The present invention contemplates novel devices and products for detecting scintillations generated within a liquid of the foregoing type.

The primary object of the present invention is to utilize design features that both are efficacious individually and cooperate with each other in such a way as to provide a nuclear radiation detecting system of unprecedented performance. These features include a novel light-tight mechanism having a scintillation detector, and a plurality of novel light-tight magazines for carrying a plurality of novel containers of liquids of the aforementioned type. The arrangement is such that the various containers can be enclosed within the various magazines for periods of time sufficient to ensure the elimination of undesired residual luminescence. Any selected magazine may be associated with the mechanism in such a way that operation of the scintillation detector is controlled by an interlock that simultaneously opens dark slides in both the reader and the magazine when they are properly connected but prevents their being opened otherwise. The container is a reflecting inverted cone that tends to direct scintillated light through a window at its base toward the detector and is supported within the magazine by a grid that interposes little or no interference to the transmission of scintillated light.

Other objects of the present invention will in part be obvious and will in part appear hereinafter.

The invention accordingly comprises the apparatus possessing the construction, combination of elements and arrangement of parts and the product possessing the features, properties and relation of components, which are exemplified in the following detailed disclosure and the scope of which will be indicated in the appended claims.

For a fuller understanding of the nature and objects of the present invention reference should be had to the following detailed description, taken in connection with the accompanying drawing, wherein:

FIG. 1 is a side elevation of a preferred embodiment of the present invention in operative condition;

FIG. 1a is an electrical block diagram of the device of FIG. 1;

FIG. 2 is a side elevation of the device of FIG. 1, in inoperative condition;

FIG. 3 is a perspective view of the device of FIG. 1;

FIG. 4 is a perspective view of a magazine embodying the present invention;

FIG. 5 is an exploded perspective view of the magazine of FIG. 4;

FIG. 6 is a perspective view of one of the components of the magazine of FIG. 4, in actuated condition;

FIG. 7 is a perspective view of one of the components of the device of FIG. 1;

FIG. 8 is a perspective view of the component of FIG. 7, in actuated condition;

FIG. 9 is a cross-sectional view of the component of FIG. 7, the section being taken substantially along the line 9—9 of FIG. 7; and FIG. 10 is a cross-sectional view of a component of the magazine of FIG. 5, alternative to its counterpart in FIG. 5.

Generally, the accompanying drawings disclose a mechanism and a container that are designed to cooperate for the purpose of establishing the disintegration count rate of an unknown sample that is dispersed, together with a luminescent material, in a liquid. The mechanism includes a photomultiplier tube, the window of which, is coated with a nonreflective stratum, signals from the photomultiplier tube being applied, in usual fashion, to an amplifier, scaler and register. The container is provided with an upstanding conical enclosure having a mirror surface and a horizontal window that transmits scintillated light generated within the liquid or reflected by the enclosure. The substantially conical enclosure, for example, may be composed of a reflecting metal such as aluminum or a glass coated with aluminum. The liquid within the container, for example, is composed of an aromatic compound such as benzene or toluene, within which is dissolved as a phosphor, for example, a benzene derivative such as diphenyl or terphenyl. Inasmuch as the wave lengths of the radiation primarily emitted from such benzene derivatives fall in the far blue and ultraviolet range, a fluorescent material such as phenyl-oxazole-phenyl-oxazole-phenyl is employed to emit in the blue-green range in response to energization by the primarily emitted radiation, i.e. is employed as a spectrum shifter. The mechanism is used in conjunction with a plurality of magazines, which may be placed on the shelf with sample carrying containers therein for the purpose of permitting all residual luminescence resulting from ambient radiation to diminish to a suitable level before the magazine is mated with the mechanism.

As shown in FIG. 1, the mechanism of the present invention comprises: a housing 20 providing a compartment 22 within which a selected magazine 24 may be positioned; a light-tight closure 26 for compartment 22; an interlock 28 for opening dark slides in container 24 and housing 20 simultaneously and only after closure 26 has sealed compartment 22; and a photomultiplier tube 30 that responds to individual scintillations from the liquid of a container within magazine 24. As shown in FIG. 1a, photomultiplier tube 30 includes a plurality of dynodes 25, held at steady stepped voltages by a plurality of resistors 27, and an anode 29. The output of anode 29 is applied to a suitable amplifier 32. A scaler 34 transmits a given proportion of the signals from amplifier 32 to a register and timer 36, which determines and indicates the count rate of the sample under consideration.

As shown in FIGS. 1, 2 and 3, housing 20 includes a boxlike base 38 within which photomultiplier tube 30 and amplifier 32 are supported and confined. Mounted on base 38 is a lead shield 40, which extends from above into base 38. Shield 38 which defines compartment 22, is provided at its upper portion with a broad slot 42 and at its lower portion with a central opening 44. A magazine 24 is adapted to be positioned within compartment 22 through slot 42. Photomultiplier tube 30 extends through opening 44 into communication with compartment 22. Slot 42 may be covered by a lead closure 46, which is carried by a pivoted mount 48. Mount 48 comprises a pair of opposed plates 50 and 52. Plates 50 and 52 are joined at one end of mount 48 by a counterweight 56. Mount 48 is pivoted at 58 in such a way that closure 46 may be opened merely by manually lifting handle 52. When mount 48 is in its most clockwise position (as viewed in FIG. 1), compartment 22 is shielded against ambient radiation. When mount 48 is in its most counterclockwise position (as viewed in FIG. 2), compartment 22 is open for the reception or removal of magazine 24, which is now to be described.

As is best shown in FIGS. 4, 5 and 6, magazine 24 comprises a base 60 for supporting a container 62 to be described below and a cover 64 that removably may be carried by the base for the purpose of enclosing the container. Base 60 includes a lower member 66 that is centrally apertured at 68 and that is provided with a dark slide 70 for covering aperture 68 in light-tight fashion when closed and uncovering aperture 68 when opened. A grid 72 of extremely fine wire traverses aperture 68 across its lower circumference for the purpose of providing a support for container 62. Connected to lower member 66, as by suitable bolts 74, is an upper member 76. The peripheral regions of upper member 76 extend beyond the peripheral regions of lower member 66 (FIG. 9). Upper member 76 provides a medial opening. Upon upper member 76 is a spring plate 81 that provides a medial opening 78. The edges of this opening are associated with surrounding arcuate slots that enable the edges to flex slightly with respect to corresponding rigid edges of member 76. Opening 78 provides arcuate sections 82 of given diameter and connecting arcuate sections of enlarged diameter. Arcuate sections 82 are designed to receive corresponding extensions 84 from cover 74 in such a way as to permit the extensions to slide between edges of the upper and lower members when the cover is rotated appropriately. A pair of lugs 86, 90 on upper member 76 limit the rotation of cover 64 with respect to base 60. When container 62 is supported by grid 72, with cover 64 mated to base 60 and dark slide 70 in closed position, as shown in FIG. 9, the depending rim 101 of member 76 is received by a circular slot 103 in housing 38 and the lower periphery 105 of cover 69 is received by a circular slot shown at 80 in FIG. 5 and at 107 in FIG. 9. Under these circumstances, container 62 is totally protected from ambient light, as shown in FIGS. 7, 8, 9 and as mentioned above, an interlock 28 is provided for the purpose of ensuring that a dark slide 96 covering an opening 98 into base 38 is closed when closure 46 is pivoted into opened condition and for the purpose of coacting with magazine 24 to permit dark slide 96 of base 38 and dark slide 70 of magazine 24 to be opened simultaneously when closure 46 is pivoted into closed condition. Interlock 48 includes a pair of opposed rails 100 and 102, which are joined at opposed ends by a handle 104 and a stop 106. Rails 100 and 102 are slidably received in slots 108 and 110, which are provided in that portion of base 38 defining opening 98. Dark slide 96 of base 38 is fastened at opposed edges to rails 100 and 102 and is provided with an upstanding lug 108. When magazine 24 is properly positioned within opening 98, a slot 109 in dark slide 70 receives lug 108. The arrangement is such that when handle 104 is manually moved to the left (as viewed in FIGS. 8 and 9) both dark slide 96 and dark slide 70 are moved to the left in order to uncover opening 68 in base 60 and opening 98 in base 38. Under these circumstances scintillated light from the container within magazine 24 may be received by photomultiplier tube 30. On the other hand when handle 104 is moved to the right (as viewed in FIG. 7), in the event that mount 26 is pivoted so as to open compartment 23, stop 106 abuts against the rearward cam surface 108 of mount 26. Under these circumstances handle 104 cannot be moved and dark slide 96 is locked in closed position so that ambient light cannot reach photomultiplier tube 30.

Container 62 and photomultiplier tube 30 both are designed to maximize the reception of scintillated light from a sample within the container. As is shown in FIG. 5, container 62 is in the form of a glass bottle having a downwardly diverging conical enclosure 108 and a thin, horizontal bottom window 110. The inner surface of conical enclosure 108 is provided with a mirror coating composed, for example, of aluminum. Alternatively, the container may be in the form shown at 112 in FIG. 10 as comprising a downwardly diverging conical enclosure 114, composed of a reflecting metal such as aluminum, and a thin, horizontal transparent window 116, composed of a transparent fused inorganic compound such as quartz. The periphery of window 116 is secured to the periphery of conical enclosure 114 within shoulders 118. The upper mouth of either container 62 or container 112 may be covered by a stopper such as that shown at 120, in FIG. 5 or a cap such as that shown at 122 in FIG. 9, or the like. Photomultiplier tube 30 as shown in FIG. 1a has a window that is provided with an upper surface having a nonreflecting coating. The thickness of this coating is equal to one-quarter of the wavelength of the scintillated light emitted from container 62. The index of refraction of this nonreflecting coating is properly chosen at some value intermediate between that of air and the material of the window of the container.

In operation, a plurality of samples to be measured are dispersed within a plurality of phosphorescent liquids, which are enclosed by a plurality of containers of the types shown in FIGS. 5 and 9. These containers are confined within magazines 24, the bases and covers of which are mated for the purpose of keeping the containers in a light-free environment for a desired length of time during which all residual phosphorescence decays to a suitable low value. These magazines, in turn, are inserted within mechanism 20 in the following way. Handle 54 is manually lifted in such a way that cam surface 108 of mount 26 abuts against stop 106 of interlock 28. Under these circumstances, dark slide 96 of housing 38 is closed. One of the magazines is fitted into opening 98 of base 38 in such a way that slot 109 of dark slide 70 receives lug 108 of dark slide 96. Next, handle 54 is manually lowered until cam surface 108 disengages stop 106. Next, handle 104 is manually drawn outwardly in such a way that dark slides 96 and 70 uncover their respective openings. Then, scintillations from container 62 are directed from the liquid and reflected by the conical enclosure of the container through the non-reflecting window of photo-multiplier tube 30. In consequence, the radiation count of the sample within the container is determined by amplifier 32, scaler 34 and register-timer 36. Finally, handle 104 is moved inwardly, handle 54 is moved upwardly and magazine 24 is removed to permit its replacement by another magazine.

Since certain changes may be made in the above device and product without departing from the scope of the invention herein involved, it is intended that all matter contained in the above description or shown in the accompanying drawing shall be interpreted in an illustrative and not in a limiting sense.

What is claimed is:

1. A device for determining the radioactivity of a sample, said device comprising a housing providing a compartment, a magazine adapted to be removably mounted in said compartment, said housing providing a dark slide associated with an opening in said housing, said magazine providing a dark slide associated with an opening in said magazine, the openings being aligned and the dark slides being interconnected when said magazine is predeterminedly associated with said housing, a container for said sample within said magazine, a detector within said housing, closure means for said compartment, interlock means for opening and closing said dark slides, said interlock means maintaining said dark slide of said housing closed when said closure is opened, said interlock means permitting said dark slides to be opened when said closure is closed.

2. The device of claim 1 wherein a liquid is within said container.

3. The device of claim 1 wherein said container is supported on a grid of thin wires traversing said opening of said magazine.

4. The device of claim 1 wherein said container includes an upstanding conical enclosure and a horizontal window, said conical enclosure being radiation reflecting, said window being radiation transmitting.

5. A device for determining the radioactivity of a selected one of a plurality of samples, said device comprising a housing providing a compartment, a plurality of magazines, a selected one of said magazines being adapted to be mounted in said compartment, said housing providing a dark slide associated with an opening in said housing, said magazine providing a dark slide associated with an opening in said magazine, the openings being aligned and the dark slides being interconnected when said magazine is predeterminedly associated with said housing, a plurality of containers for said samples within said magazines, a detector for receiving radiation from the container within said selected one of said magazines, closure means for said compartment, interlock means for opening and closing said dark slides, said interlock means maintaining said dark slide of said housing closed when said closure is opened, said interlock means permitting said dark slides to be opened when said closure is closed, one each of said samples being disposed in one each of said containers and one each of said containers being associated in one each of said magazines.

6. The device of claim 5 wherein a liquid phosphor is within said containers.

7. The device of claim 5 wherein said containers are supported on grids of thin wires traversing the openings of said magazines.

8. The device of claim 1 wherein said container includes an upstanding conical enclosure and a horizontal window, said conical enclosure being radiation reflecting, said window being radiation transmitting.

References Cited in the file of this patent

UNITED STATES PATENTS

| | | |
|---|---|---|
| 2,622,208 | Bernstein et al. | Dec. 16, 1952 |
| 2,765,411 | Kerr | Oct. 2, 1956 |
| 2,855,520 | Stoddard et al. | Oct. 7, 1958 |
| 2,879,398 | Garrison | Mar. 24, 1959 |
| 2,884,529 | Eggler et al. | Apr. 28, 1959 |
| 2,907,881 | Roucayrol et al. | Oct. 6, 1959 |
| 2,924,718 | Packard et al. | Feb. 9, 1960 |

OTHER REFERENCES

Liquid Scintillation Beta Counters for Radioactive Solids, Nucleonics, vol. 10, No. 9, September 1952, pp. 48 to 51.

Scintillation Counter for Assay of Radon Gas, by Van Dill et al., Nucleonics, vol. 13, No. 2, February 1955, pp. 68 and 69.

Liquid Scintillation Techniques for Radiocarbon Dating, by Pringle et al., The Review of Scientific Instruments, vol. 26, No. 9, September 1955, pp. 859–865.

Liquid Scintillation Counting for Assay of Tritium in Urine, by Okita et al., vol. 14, No. 3, Nucleonics, March 1956, pp. 76 to 79.

Counting Suspensions in Liquid Scintillators, by Hayes et al., Nucleonics, vol. 14, No. 3, March 1956, pp. 48 to 51.